No. 796,312. PATENTED AUG. 1, 1905.
D. R. S. GALBRAITH.
APPARATUS FOR THE REDUCTION OF IRON SAND, IRON OXID, AND OTHER SUITABLE SUBSTANCES.
APPLICATION FILED OCT. 27, 1903.
3 SHEETS—SHEET 1.
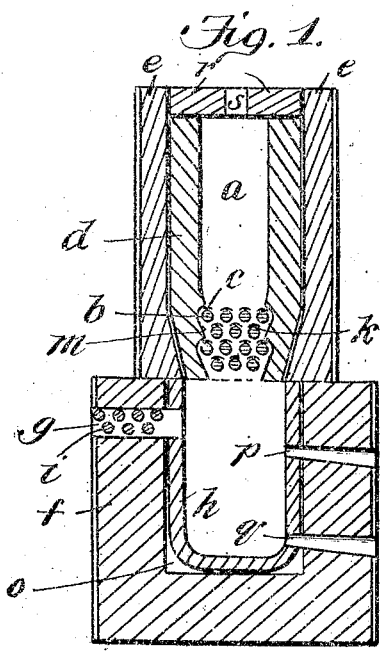
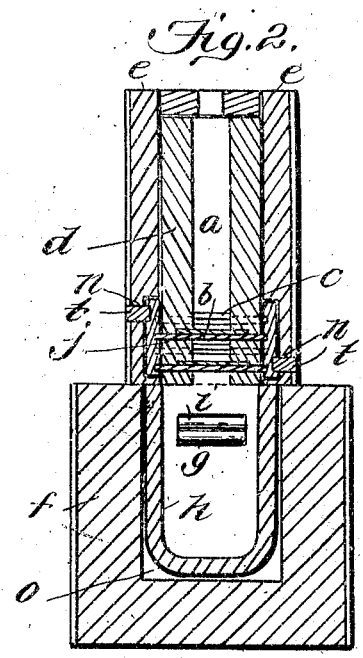
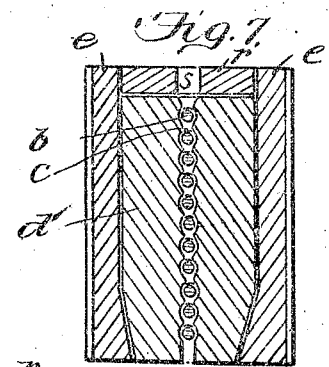
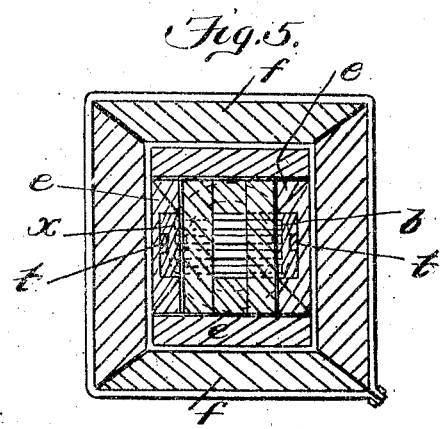
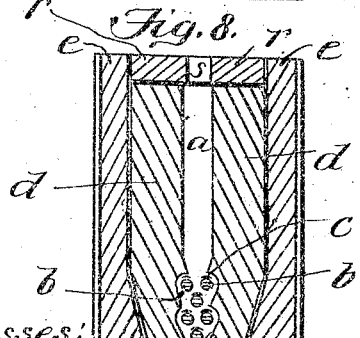
Witnesses:
Inventor
David R. S. Galbraith
By James L. Norris No. 796,312. PATENTED AUG. 1, 1905.
D. R. S. GALBRAITH.
APPARATUS FOR THE REDUCTION OF IRON SAND, IRON OXID, AND OTHER SUITABLE SUBSTANCES.
APPLICATION FILED OCT. 27, 1903.

3 SHEETS—SHEET 2.

Witnesses:
Inventor
David R. S. Galbraith
By James L. Norris
Atty.

No. 796,312. PATENTED AUG. 1, 1905.
D. R. S. GALBRAITH.
APPARATUS FOR THE REDUCTION OF IRON SAND, IRON OXID, AND OTHER SUITABLE SUBSTANCES.
APPLICATION FILED OCT. 27, 1903.

3 SHEETS—SHEET 3.

Witnesses:
C. D. Kesler
James L. Morris, Jr.

Inventor
David R. S. Galbraith
By James L. Norris
Atty.

UNITED STATES PATENT OFFICE.

DAVID RANKEN SHIRREFF GALBRAITH, OF AUCKLAND, NEW ZEALAND, ASSIGNOR OF ONE-HALF TO WILLIAM STEUART, OF AUCKLAND, NEW ZEALAND.

APPARATUS FOR THE REDUCTION OF IRON-SAND, IRON OXID, AND OTHER SUITABLE SUBSTANCES.

No. 796,312. Specification of Letters Patent. Patented Aug. 1, 1905.

Application filed October 27, 1903. Serial No. 178,786.

*To all whom it may concern:*

Be it known that I, DAVID RANKEN SHIRREFF GALBRAITH, analytical and consulting chemist, fellow of the Institute of Chemistry of Great Britain and Ireland, of Ladies Mile, Remuera, Auckland, New Zealand, have invented a certain new and useful Apparatus for the Reduction of Iron-Sand, Iron Oxid, and other Suitable Substances, of which the following is a specification.

This invention relates to an electrical furnace adapted for treating iron-sand, oxid of iron, refractory ores, or other substances for the purpose of producing iron, steel, or other metal or other substances.

The apparatus, which is used for the treatment of any substances for which it is applicable, consists mainly of a furnace suitably constructed, as is hereinafter described, with resistances placed therein, on and around which the material being treated falls when fed into the furnace. Means are provided for introducing producer-gas through the base on which the furnace stands and into a receiving vessel placed beneath the furnace, so that the gas may travel upward through the said furnace, and outlet-holes are also provided for drawing off from the said vessel slag and product resulting from the treatment.

Figure 3:
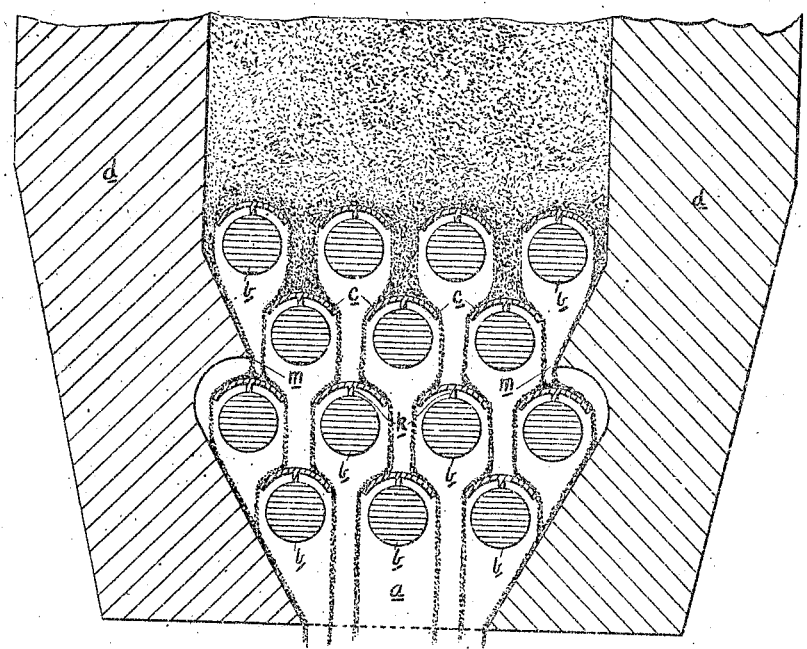
Figure 4:
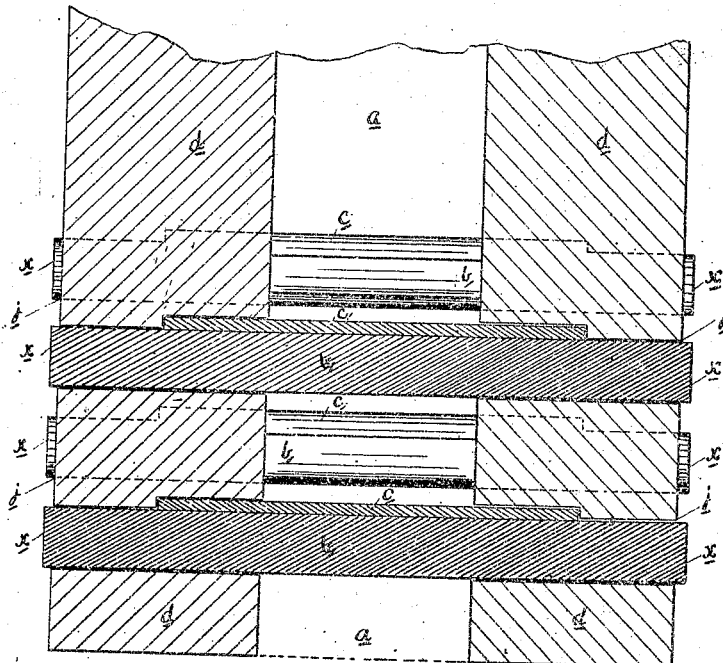
Figure 9:
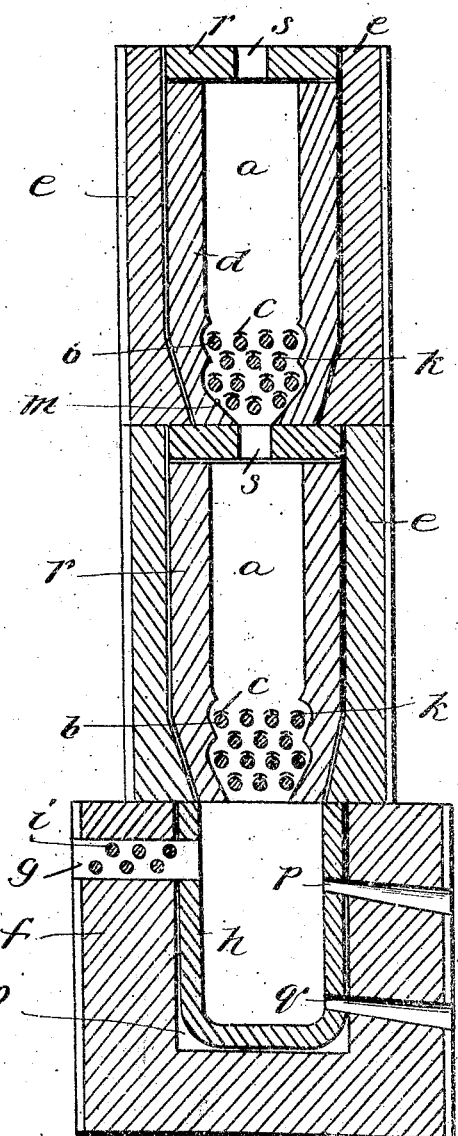

In the drawings, Figure 1 is a vertical section of a furnace constructed in accordance with this invention. Fig. 2 is a like view at right angles to Fig. 1. Fig. 3 is an enlarged horizontal section. Fig. 4 is an enlarged vertical section of the fusing zone of the furnace as shown in Fig. 2. Fig. 5 is a sectional plan. Fig. 6 is a vertical section showing the laterally-extending form of the intercepters. Fig. 7 is a vertical section of a furnace having a vertically-extending fusing zone fitted with superposed incandescents. Fig. 8 is a like view showing a less number of laterally separated and superposed incandescents, showing the arrangement of Fig. 2; and Fig. 9 is a vertical section of a modification, showing the superposing of two furnaces.

The furnace $a$ may be described as a "shaft," not necessarily restricted to this one form, however, in which there are located several transverse tiers of resistance or resistances $b$, hereinafter called "incandescents," in an electric circuit or circuits of the requisite intensity of current, which intensity will vary according to the size of the furnace, there being between such incandescents $b$ a passage more or less tortuous for the iron-sand or other substance or substances undergoing treatment to pass through downward, and for the gases either liberated from the material being treated or which may be supplied to the furnace $a$ to pass through upward, as shown in Figs. 1 to 5. The incandescents $b$ may be composed of any suitable material—of carbon, for example—and they may be of any suitable shape and dimensions and any number required, and they may be located or fixed at any suitable distance apart and in groups or otherwise placed. The incandescents $b$ may or may not be protected from immediate contact with the descending iron-sand or other substances by intercepters $c$, which also serve the purpose of temporarily intercepting and deflecting the descent of iron-sand or other substances undergoing treatment and of directing the same in its descent throughout the group or groups or series of tiers of incandescents $b$.

The incandescents $b$ and intercepters $c$ are placed in due position by means of suitable perforations $j$ in the furnace-body $d$ and rest therein, as shown in Figs. 2, 3, and 5, and the intercepters $c$ being provided with a rest or foot $k$ at each end, which rests upon the incandescents $b$, and thus support the intercepters $c$ at the required distance from the incandescents $b$. Asbestos or other suitable packing may, however, be used in place of the feet $k$ and also for securing all necessary insulation between the various incandescents $b$. One group of tiers or several superposed groups of tiers of these incandescents $b$ and either with or without intercepters $c$ may be used, such groups of tiers being separated any suitable distance apart within, say, one to two inches or thereabout. The sides of the furnace $a$ interiorly are provided with guide-chutes $m$ to deflect and direct the descending iron-sand or other substances falling on and immediately adjacent thereto in the desired course.

The furnace-body $d$ may be constructed of four slabs of suitable refractory material, such as bauxite, the joints thereof being luted, as required. When the nature of the iron-sand, iron oxid, or other substance being treated so requires, a special furnace-lining of bauxite or such like may be adopted and used, which can be renewed as required, or the furnace-body may be interiorly constructed and lined in any suitable way to meet requirements. The intercepters $c$ are also composed and made of any suitable refractory material, such as bauxite or fire-clay.

The incandescents $b$ are brought into the necessary electric circuit or circuits through suitable perforations $n$ in the furnace-casement $e$ or by any other suitable means.

The furnace $a$ may be made of any suitable dimensions. Figs. 1, 2, and 3 on the drawings herewith represent a small furnace for experimental purposes and are drawn on a scale of about one inch to the foot. This furnace for commercial work may be increased to any capacity double or treble of that illustrated or to whatever capacity is required. The furnace-casement $e$ is suitably luted upon the base $f$, which base $f$ serves as a casement for the receiving vessel $h$, placed within the chamber $o$, made therein. The receiving vessel $h$ may be made of plumbago or other suitable material, and its contents may in due course be also further heated by resistance in any suitable manner known to technologists.

A suitable reducing-gas is passed by a suitable gasway $g$ through the walls of the base or casement $f$ and receiving vessel $h$. Electro-resistances $i$ may be located in the gasway $g$ for superheating such reducing-gas before it comes into contact with the contents of the electric furnace $a$, or it (the reducing-gas) may be passed already heated in through the gasway $g$ direct from the gas-producer. Producer-gas is a suitable gas to use; but vaporized mineral oil may be used in place thereof or in conjunction therewith.

Tap-holes $p$ and $q$ are provided in the receiving vessel $h$ and carried through the base or casement $f$, the upper one, $p$, being for drawing off from the vessel $h$ the accumulated slag and the lower one, $q$, for drawing off the steel, iron, or other metal or substances therein deposited.

In operating the furnace $a$ producer-gas, say, is passed in by the gasway $g$, full control being kept both of the supply and the pressure thereof, and the receiving vessel $h$ is heated, as before referred to. The electric current is switched onto the incandescents $b$ within the electric furnace $a$ from dynamo or other suitable source of electricity, the iron-sand having been separated from silica and other foreign objectionable substances and mixed with powdered carbon, coke, or charcoal, for example, or other substances is fed into the upper end of the electric furnace $a$ in any desired quantity in a shower and preferably red hot, the feed being carefully adjusted according to the capacity of the fusing zone or zones within the furnace $a$—that is to say, the group or groups of incandescents. The proportions of reducing agent—powdered charcoal, for example—can only be determined for any given case, as also the proportion of flux. In the case of pure iron oxid in iron-sand or other form the equivalent of carbon necessary to reduce the oxid of iron will be added thereto. This is easily found by analysis of the given sample in a way well known to all chemists. It is not a matter of experiment nor of any private knowledge. In the case of oxid of iron in iron-sand or other form which has been previously prepared, as hereinafter explained, the proportion of carbon will be regulated in the same way, commencing with wholly-unreduced iron oxid at the one end of the scale and finishing with wholly-reduced iron oxid at the other, where no reducing-carbon will be required in admixture with such wholly-reduced iron-sand. In each case sufficient additional carbon (charcoal) is supplied to the charge to produce steel, mild or hard, as desired, and this additional carbon is also adjusted by the technologist for any given case. In the same manner the flux will be adjusted by analysis for any given case. The aim, however, is to separate, if possible, all foreign matters, so that no flux will be necessary. The operations may be watched through any suitable apertures or openings made for the purpose. The mixture of iron-sand and carbon passes down through the group, groups, or series of tiers of incandescents and falls as an iron product into the receiving vessel $h$, from which it may be tapped off if sufficiently fluid through the lower tap-hole $q$ or, if not, the receiving vessel $h$ may be modified in form from that illustrated to suit the product and to admit of its easy removal. This product may, on the other hand, be further treated, if required, by being passed again through similar furnaces either separated or subposed to the one just used. Should an excess of carbon be used in the electric furnace $a$—that is to say, more than is required to reduce the oxid of iron—the steel or iron will flow more readily, and this excess of carbon can be removed from the steel or iron by means well known to metallurgists. Two or more of these furnaces superposed may be used, as shown in Fig. 9, the discharge from the higher furnace being made the feed of the next in order. In that case the iron-sand or iron oxid will not require to be heated prior to its being fed into the higher or top furnace.

As regards the method hereinbefore referred to, it is to be particularly noted that the aim thereof is to insure a continual movement of commingling, mixing, and remixing of the furnace charge—that is to say, the iron-sand, iron oxid, carbon, and other substances forming the feed during the descent of the same through the furnace, as distinguished from the mere subsidence in mass of the furnace charge which occurs in other processes or methods. This commingling, mixing, and remixing of the furnace charge—namely, the iron-sand and carbon, for example—is secured by the passing or running of the same over the intercepters $c$ or the incandescents $b$, should the incandescents $b$ alone be used, and the passing from one tier to the other and lower tier and from higher groups of tiers to lower groups and from a higher electric furnace $a$ to a lower electric furnace $a$ should several groups of tiers or two or more electric furnaces $a$ be used superposed as hereinbefore set forth.

Where desirable, the higher tiers or groups of incandescents $b$ and or intercepters $c$ may be arranged at right angles in relation to those below or in any other advantageous order or position. Should incandescents $b$ be used without intercepters $c$, these incandescents $b$ may be given the form indicated in cross-section in Fig. 6 and may be arranged so that the iron-sand or other substance being treated shall fall or flow from the higher incandescents $b$ to the lower ones, as in the manner hereinbefore set forth.

In claiming the widest range as to the construction and arrangement of the electric furnace as a whole the following, among other possible alternatives, may be set forth—namely, the shaft $a$ of the electric furnace may be made cylindrical and the incandescents $b$ and or intercepters $c$ may take the form of flat rings duly beveled to clear their surface of the falling iron-sand and other substances. These flat rings will be bisected across their circumference and duly insulated at the sections, so that the required electric current may be established. These rings may be arranged in tiers within the cylindrical shaft, and the furnace charge will descend from the higher ones to the lower in the same manner as hereinbefore set forth. The shaft may also be given a form to suit incandescents $b$ and or intercepters $c$, arranged as a series of steps, the iron-sand and other substances traveling down from step to step, the surface of such steps being placed at any required angle for the pupose of facilitating the descent of the iron-sand and or other substances thereover. Figs. 7 and 8 show how the incandescents and intercepters $c$ may be grouped and placed within the furnace $a$. Fig. 7 shows them in one vertical line only with the sides of the furnace $a$ closed in around so as to make deflectors or guide-chutes $m$, while Fig. 8 shows two in a row with one beneath, and so on alternately. These illustrations are given to show that the incandescents $b$ and intercepters $c$ can be arranged in different ways to suit requirements. They may also be arranged from the top of the furnace to the bottom, if so desired, so as to entirely fill the furnace, and if this plan is adopted the casement $e$ will be further chambered, as shown in Figs. 2 and 3. The incandescents $b$ may be one or more in one plane and any number may be superposed at any convenient distance apart—say twelve—placed in superposition two inches, or about, apart and inclosed in a suitable chamber, as shown. Iron-sand or iron oxid may be prepared before being introduced into the electric furnace $a$ by heating it with a proportion of carbon in powder or by heating it in the presence of suitable reducing-gas, such as carbon monoxid, or in the presence of hydrocarbon-vapor, such as petroleum. Before the iron-sand or iron oxid or other substances are subjected to this furnace treatment the foreign bodies therein are separated therefrom by magnetic or other suitable means. When silicious or other objectionable matter is present in a small proportion only, a small proportion of any suitable flux—such as lime, for example—may be added and mixed with the substances before treatment. The electric furnace may be placed above a suitable coke or gas furnace, and the iron, steel, or other products of the former may be received in the latter. The products of the electric furnace may be further treated by any of the methods already known to metallurgists. Among the other substances which may be treated by my furnace and method I may name ores of manganese and tin. These are of course suitably pulverized before passing through the furnace, so as to approximate to the physical condition of iron-sand.

The cup $r$ is shown in Figs. 1, 2, 7, and 8 fitted onto the top of the furnace-body $d$. A hole $s$ is provided or made therein for passing the feed into the furnace or shaft $a$. This hole $s$ can, if so required, be closed in any suitable way. Carbon blocks $t$ are shown in Fig. 2, which are placed in the casement $e$ to enable the electric contact to be made at the points marked $w$, before referred to. Fig. 3, being a section of the furnace as a whole, shows the four sides of the casement $e$, which are illustrated in Figs. 1 and 2 by side and front views.

Any form of clamps with adjustable springs can be used to bind and retain the various parts of the furnace as a whole together.

The means of putting the iron-sand and other substances in the form of a shower-feed into the furnace-shaft $a$ may take the shape of a suitable vessel—say a plumbago crucible—with the necessary perforations in the bottom thereof, which would rest in the feed-hole $s$, three rests between the crucible and walls of feed-hole $s$ being provided, so that spaces will be left between the crucible and the wall of the feed-hole $s$ for the free passage of furnace-gases outward.

Having fully described my invention, what I desire to claim and secure by Letters Patent is—

1. An electrical furnace for the purpose set forth comprising a casement, a furnace-body arranged therein, resistances mounted within the furnace-body, intercepters arranged in suitable relation to the resistances, carbon blocks mounted in the casement and projecting into the furnace-body, a cap mounted upon the furnace and provided with a feed-opening, a chambered casement supporting said furnace and first-mentioned casement, said supporting-casement provided with a gas-inlet and a pair of tap-openings, and a receiving vessel mounted in the chamber of the supporting-casement and provided with an inlet and a pair of discharge-openings registering, respectively, with the gas-inlet and tap-openings of the supporting-casement.

2. An electrical furnace for the purpose set forth comprising a casement, a furnace-body arranged therein, resistances mounted within the furnace-body, intercepters arranged in suitable relation to the resistances, carbon blocks mounted in the casement and projecting into the furnace-body, a cap mounted upon the furnace and provided with a feed-opening, a chambered casement supporting said furnace-body and first-mentioned casement, said supporting-casement provided with a gas-inlet and a pair of tap-openings, a receiving vessel mounted in the chamber of the supporting-casement and provided with an inlet and a pair of discharge-openings registering, respectively, with the gas-inlet and tap-openings of the supporting-casement, and resistances mounted in said gas-inlet.

3. An electrical furnace for the purpose set forth comprising a casement, a furnace-body arranged therein, resistances mounted within the furnace-body, intercepters arranged in suitable relation to the resistances, a chambered casement supporting said furnace-body and the first-mentioned casement, said supporting-casement provided with a gas-inlet and a pair of tap-openings, and a receiving vessel mounted in the chamber of the supporting-casement and provided with an inlet and a pair of discharge-openings registering, respectively, with the gas-inlet and tap-openings of the supporting-casement.

4. An electrical furnace for the purpose set forth comprising a casement, a furnace-body arranged therein, resistances mounted within the furnace-body, intercepters arranged in suitable relation to the resistances, a chambered casement supporting said furnace-body and first-mentioned casement, said supporting-casement provided with a gas-inlet and a pair of tap-openings, a receiving vessel mounted in the chamber of the supporting-casement and provided with an inlet and a pair of discharge-openings registering, respectively, with the gas-inlet and tap-openings of the supporting-casement, and resistances mounted in said gas-inlet.

5. In combination, a pair of superposed electrical furnaces, each of said furnaces consisting of a casement, a furnace-body arranged therein, resistances mounted within the furnace-body, intercepters arranged in suitable relation to the resistances, carbon blocks mounted in the casement and projecting into the furnace-body, and a cap mounted upon the furnace-body and provided with a feed-opening, and a receptacle communicating with the lower of said furnaces and provided with discharge-openings.

6. An electrical furnace for the purpose set forth comprising a casement, a furnace-body arranged therein, resistances mounted within the furnace-body, carbon blocks mounted in the casement and projecting into the furnace-body, a cap mounted upon the furnace and provided with a feed-opening, a chambered casement supporting said furnace and first-mentioned casement, said supporting-casement provided with a gas-inlet and a pair of tap-openings, and a receiving vessel mounted in the chamber of the supporting-casement and provided with an inlet and a pair of discharge-openings registering, respectively, with the gas-inlet and tap-openings of the supporting-casement.

7. An electrical furnace for the purpose set forth comprising a casement, a furnace-body arranged therein, resistances mounted within the furnace-body, carbon blocks mounted in the casement and projecting into the furnace-body, a cap mounted upon the furnace and provided with a feed-opening, a chambered casement supporting said furnace-body and first-mentioned casement, said supporting-casement provided with a gas-inlet and a pair of tap-openings, a receiving vessel mounted in the chamber of the supporting-casement and provided with an inlet and a pair of discharge-openings registering, respectively, with the gas-inlet and tap-openings of the supporting-casement, and resistances mounted in said gas-inlet.

8. An electrical furnace for the purpose set forth comprising a casement, a furnace-body arranged therein, resistances mounted within the furnace-body, a chambered casement supporting said furnace-body and the first-mentioned casement, said supporting-casement provided with a gas-inlet and a pair of tap-openings, and a receiving vessel mounted in the chamber of the supporting-casement and provided with an inlet and a pair of discharge-openings registering, respectively, with the gas-inlet and tap-openings of the supporting-casement.

9. An electrical furnace for the purpose set forth comprising a casement, a furnace-body arranged therein, resistances mounted within the furnace-body, a chambered casement supporting said furnace-body and first-mentioned casement, said supporting-casement provided with a gas-inlet and a pair of tap-openings, a receiving vessel mounted in the chamber of the supporting-casement and provided with an inlet and a pair of discharge-openings registering, respectively with the gas-inlet and tap-openings of the supporting-casement, and resistances mounted in said gas-inlet.

DAVID RANKEN SHIRREFF GALBRAITH.

Witnesses:
GEORGE WILLIAM BASLEY,
PERCY HERBERT BASLEY.